(Model.)

M. WHEELER.
WHEEL FENDER FOR VEHICLES.

No. 259,619. Patented June 13, 1882.

Witnesses.
N. W. Mortimer,
W. H. Kerr.

Inventor.
M. Wheeler,
per
F. A. Lehmann,
Atty.

United States Patent Office.

MARSHAL WHEELER, OF PHILADELPHIA, PENNSYLVANIA, ASSIGNOR TO BENJAMIN F. ENOCH, OF SAME PLACE.

WHEEL-FENDER FOR VEHICLES.

SPECIFICATION forming part of Letters Patent No. 259,619, dated June 13, 1882.

Application filed March 6, 1882. (Model.)

*To all whom it may concern:*

Be it known that I, MARSHAL WHEELER, of Philadelphia, in the county of Philadelphia and State of Pennsylvania, have invented certain new and useful Improvements in Guards for Vehicles; and I do hereby declare the following to be a full, clear, and exact description of the invention, such as will enable others skilled in the art to which it pertains to make and use it, reference being had to the accompanying drawings, which form part of this specification.

My invention relates to an improvement in guards for vehicle-wheels; and it consists, first, in the combination of a horizontal rod or arm which is secured to the end of the axle, the guard for the wheel which is secured thereto, suitable braces, and a curtain which is buttoned to the guard; second, in the combination of the guard which covers the wheel, a guard at the rear end of the main guard, and a guard on the lower edge of the main guard, whereby the mud which is thrown upward by the rim and the spokes of the wheel is prevented from striking the body of the vehicle; third, in the arrangement of braces which serve both to hold the fender in place and to prevent the body of the vehicle from striking against the fender when the wheels are cramped, all of which will be more fully described hereinafter.

The object of my invention is to provide a fender for wheels of vehicles which will serve to prevent the body from being covered with mud or dirt, and prevent the clothes of the person getting in and out of the vehicle from being soiled.

Figure 1:
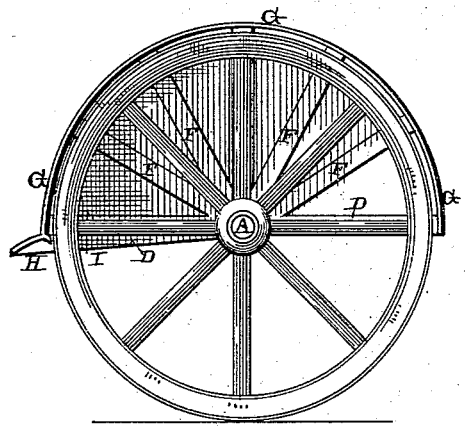
Figure 2:
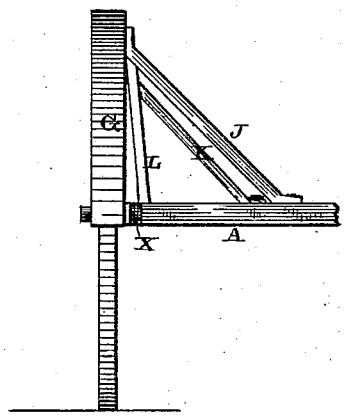
Figure 3:
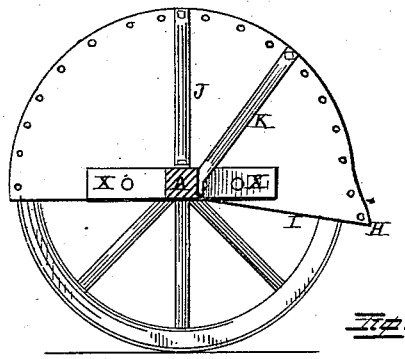
Figure 4:
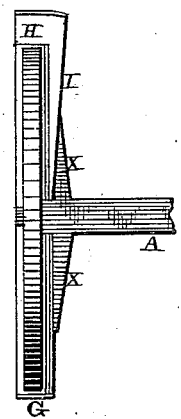
Figure 5:
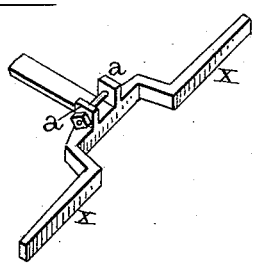

Figure 1 is a side elevation of my invention. Fig. 2 is an edge view of the same. Fig. 3 is a view taken from the inside. Fig. 4 is an inverted view. Fig. 5 is a perspective of the arm by which the guard is secured to axle.

A represents the axle of a vehicle of any kind, and which has the two arms X extending horizontally outward through it, and to which arms the fender or guard is secured in any suitable manner. These arms may be made as a part of the axle, where the axle is made of metal; or there may be formed a suitable projection upon the top of the axle, to which the arms will be secured in any suitable manner. Where the arms are to be attached to the axle, they will be made in a single piece and have ears *a* formed upon it, so as to pass up or down over opposite sides of the axle, and then be bolted in place. The fender-frame consists of the horizontal portion D, from which radiate a number of arms, F, to the outer end of which is secured the semicircular guard G, which extends outward over the top of the wheels any suitable distance. The inner side of this frame or fender is provided with a covering made of any flexible material—such as canvas, leather, or rubber—and which is buttoned to the inner side of the fender, so that it can be made readily removable for the purpose of allowing the fender to be cleaned. Secured to the lower rear corner of the fender is a U-shaped guard, H, which serves to catch the greater part of the mud and dirt which are carried up by the wheel, and extending forward from this guard is the flaring guard I, which serves to catch any mud or dirt which may be carried up by the spokes of the wheel.

In order not only to brace the fender in place upon the axle, but at the same time to prevent the body of the vehicle from striking against the fender, suitable braces, J K L, are used, either together or separately, as may be thought best. The brace which rises from the top of the axle serves to prevent the body of the vehicle from striking against the body of the fender when the wheel is thrown around toward the front of the body of the vehicle, while the braces which extend upward and outward from the axle serve as guards to keep the fender from striking the body of the vehicle when the wheel is cramped backward.

By means of a guard or fender applied to the wheels of a vehicle all mud and dirt thrown up by the wheels are caught by this fender and prevented from striking against the body, at the same time that the clothes of the person getting in and out of the vehicle are kept from being soiled.

Having thus described my invention, I claim—

1. The combination of the axle, with the arms which extend horizontally outward therefrom, with the fender and the braces, which serve both to brace the fender in place and act as guards to prevent the fender from striking against the body of the vehicle, substantially as described.

2. The combination of the fender, with a U-shaped guard secured to its rear end, and the inwardly-flaring guard I, which serves to catch the dirt thrown up by the spokes of the wheels, substantially as set forth.

3. In a guard for wheels, the combination of the horizontal supporting-arms X, the guard G, secured thereto, the braces J K, and an apron or curtain which is buttoned to the guard, substantially as specified.

In testimony whereof I affix my signature in presence of two witnesses.

MARSHAL WHEELER.

Witnesses:
 CHAS. H. DOUGHERTY,
 W. W. DOUGHERTY.